(12) United States Patent
Heder et al.

(10) Patent No.: US 9,276,901 B2
(45) Date of Patent: Mar. 1, 2016

(54) METHOD, SYSTEM, AND APPARATUS FOR TRANSITIONING FROM IPV4 TO IPV6

(76) Inventors: Brian Heder, Hagerstown, MD (US); Casey Woodyard, Martinsburg, WV (US)

(*) Notice: Subject to any disclaimer, the term of this patent is extended or adjusted under 35 U.S.C. 154(b) by 161 days.

(21) Appl. No.: 13/111,429

(22) Filed: May 19, 2011

(65) Prior Publication Data

US 2011/0289185 A1 Nov. 24, 2011

Related U.S. Application Data

(60) Provisional application No. 61/347,238, filed on May 21, 2010.

(51) Int. Cl.
 *H04L 29/12* (2006.01)
 *H04L 29/08* (2006.01)
 *H04L 29/06* (2006.01)

(52) U.S. Cl.
 CPC ........ *H04L 61/251* (2013.01); *H04L 29/12066* (2013.01); *H04L 29/12358* (2013.01); *H04L 61/1511* (2013.01); *H04L 67/2814* (2013.01); *H04L 69/167* (2013.01); *H04L 67/02* (2013.01)

(58) Field of Classification Search
 CPC ............ H04L 29/12066; H04L 69/167; H04L 61/251; H04L 61/1511; H04L 29/12358; H04L 67/2814; H04L 67/02; H04L 61/6059; H04L 63/0281; H04L 69/08; H04L 67/28; H04L 63/0236; H04W 80/045
 USPC .......... 709/217, 230, 245, 246, 249; 370/401, 370/465, 466, 474, 349, 389, 395.5, 370/395.54; 455/435.1; 715/239
 See application file for complete search history.

(56) References Cited

U.S. PATENT DOCUMENTS

| | | | |
|---|---|---|---|
| 6,357,010 B1* | 3/2002 | Viets et al. ......................... 726/4 |
| 6,732,105 B1* | 5/2004 | Watson et al. |
| 7,328,281 B2* | 2/2008 | Takeda et al. .................. 709/246 |
| 2002/0026482 A1* | 2/2002 | Morishige et al. ............ 709/206 |
| 2002/0103931 A1* | 8/2002 | Mott ............................. 709/245 |
| 2002/0191590 A1* | 12/2002 | Niu et al. ....................... 370/352 |
| 2003/0185236 A1* | 10/2003 | Asano ................... H04L 69/161 370/469 |
| 2003/0225911 A1* | 12/2003 | Lee et al. ....................... 709/245 |
| 2004/0093434 A1* | 5/2004 | Hovell et al. .................. 709/249 |
| 2004/0103212 A1* | 5/2004 | Takeuchi et al. .............. 709/245 |
| 2004/0187076 A1* | 9/2004 | Ki et al. ......................... 715/513 |

(Continued)

*Primary Examiner* — Gary Mui
*Assistant Examiner* — Michael Phillips
(74) *Attorney, Agent, or Firm* — Schwegman Lundberg & Woessner, P.A.

(57) ABSTRACT

A system and method for provisioning a web service for enabling communication between networks running different Internet Protocol (IP) versions includes a processor-implemented communication module and a processor-implemented provisioning module. The processor-implemented communication module is configured to receive provisioning information from a content provider. The provisioning information includes a fully qualified domain name and an Internet Protocol (IP) address of a first IP version associated with the fully qualified domain name. The processor-implemented provisioning module is configured to provision the web service. The web service causes a request by a client device running a second IP version to access a content provider registered to the IP address to be redirected to a proxy server. The web service further causes the proxy server to retrieve the content from the content provider and to provide the content to the client device.

19 Claims, 8 Drawing Sheets

(56) References Cited

U.S. PATENT DOCUMENTS

| | | | |
|---|---|---|---|
| 2004/0233916 A1* | 11/2004 | Takeuchi et al. | 370/395.54 |
| 2005/0108517 A1* | 5/2005 | Dillon et al. | 713/150 |
| 2005/0201370 A1* | 9/2005 | Poyhonen et al. | 370/389 |
| 2005/0259600 A1* | 11/2005 | Chaney | 370/257 |
| 2006/0106805 A1* | 5/2006 | Aaron | 707/10 |
| 2006/0184640 A1* | 8/2006 | Hatch | 709/217 |
| 2006/0259641 A1* | 11/2006 | Kim et al. | 709/245 |
| 2007/0061455 A1* | 3/2007 | Callaghan | 709/225 |
| 2007/0171930 A1* | 7/2007 | Kamata et al. | 370/432 |
| 2008/0183902 A1* | 7/2008 | Cooper et al. | 709/250 |
| 2008/0307083 A1* | 12/2008 | Tsai et al. | 709/223 |
| 2010/0118869 A1* | 5/2010 | Li et al. | 370/389 |
| 2010/0161717 A1* | 6/2010 | Albrecht | H04L 67/2852 709/203 |
| 2010/0228813 A1* | 9/2010 | Suzuki | H04L 29/12066 709/203 |
| 2010/0306642 A1* | 12/2010 | Lowet | G06F 17/30873 715/234 |
| 2011/0153720 A1* | 6/2011 | Rajan et al. | 709/203 |
| 2011/0184963 A1* | 7/2011 | Singh Thakur et al. | 707/755 |
| 2011/0271005 A1* | 11/2011 | Bharrat et al. | 709/232 |
| 2011/0282997 A1* | 11/2011 | Prince | H04L 67/146 709/226 |
| 2012/0023090 A1* | 1/2012 | Holloway et al. | 707/709 |

* cited by examiner

METHOD, SYSTEM, AND APPARATUS FOR TRANSITIONING FROM IPV4 TO IPV6

CROSS-REFERENCE TO RELATED APPLICATIONS

This application claims the benefit under 35 U.S.C. §119 of the filing date of U.S. Provisional Application Ser. No. 61/347,238, filed May 21, 2010, and entitled "METHOD, SYSTEM, AND APPARATUS FOR TRANSITIONING FROM IPV4 TO IPV6," which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2010, Brian Heder and Casey Woodyard, All Rights Reserved.

TECHNICAL FIELD

This application generally relates to Internet protocols, and more specifically, to a system, method, and apparatus for making content stored within a network communicating according to a first Internet Protocol (IP) version available to a client communicating according to a second IP version, where the first and second IP versions are different.

BACKGROUND

Currently, several transition methods exist for transitioning from IP version 4 ("IPv4") to IP version 6 ("IPv6"), specifically related to making existing IPv4 content available to IPv6 clients, or making IPv6 content available to IPv4 clients. These methods include, but are not limited to, running a dual-stack configuration whereby both IPv4 and IPv6 are running at the same time on a given computer system; and building new IPv6 computer systems that mirror the functionality of existing IPv4 computer systems.

BRIEF DESCRIPTION OF THE DRAWINGS

In the drawings, which are not necessarily drawn to scale, like numerals describe substantially similar components throughout the several views. The drawings illustrate generally, by way of example, but not by way of limitation, various embodiments discussed in the present document.

DETAILED DESCRIPTION

Figure 1:
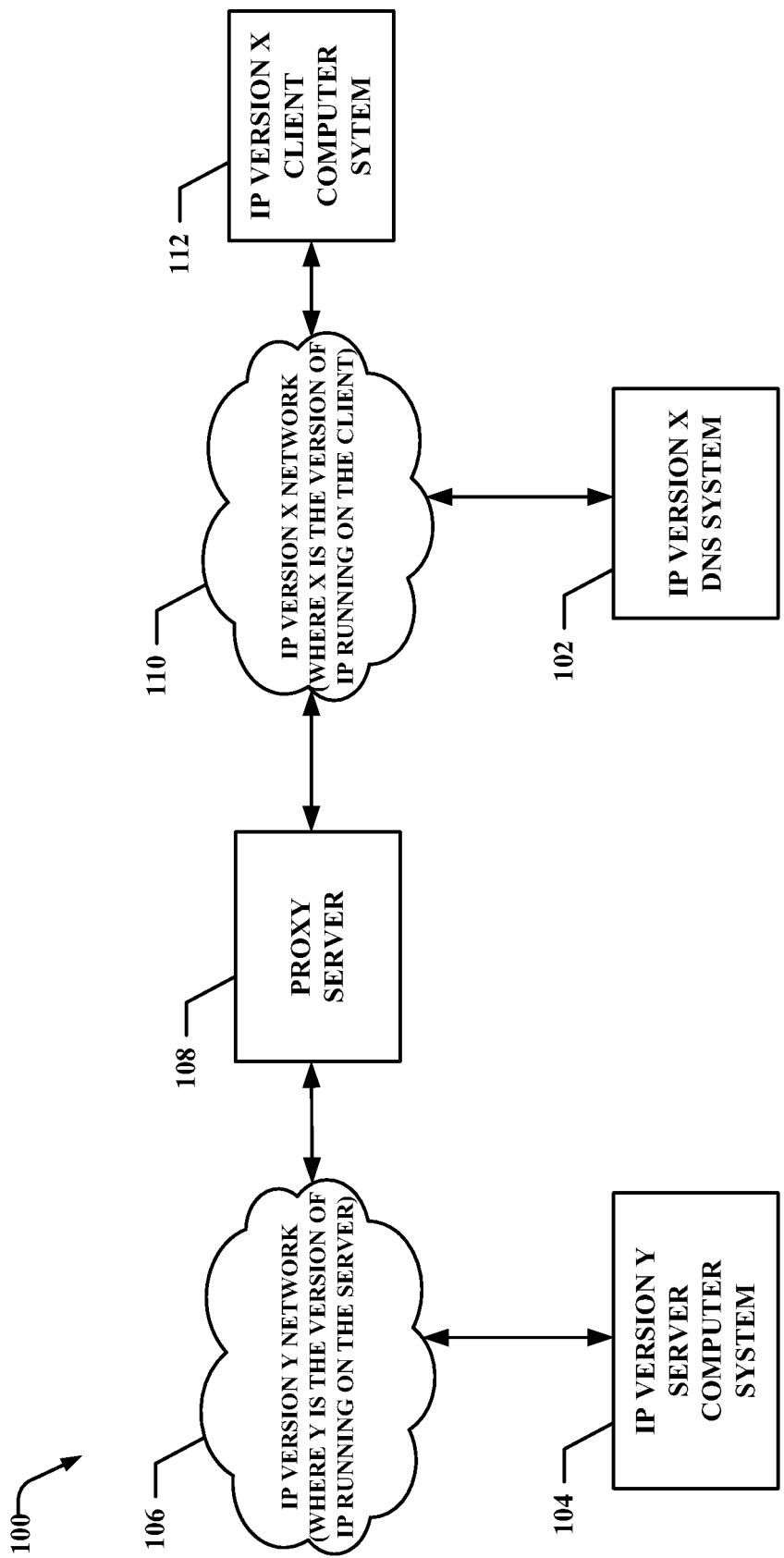
FIG. 1 is a flow diagram depicting an example method of provisioning, according to some embodiments.

In the following description, for the purposes of explanation, specific details and examples are set forth in order to provide a thorough understanding of the disclosure. However, it will be apparent that the invention may be practiced without these specific details and/or examples. Various aspects and features of embodiments of the present disclosure are described in more detail hereinafter with reference to the drawings.

As used herein, the term "client computer system" refers to the client component of the traditional client-server computing model, as is generally understood in the Information Technology (IT) and Computer Networking fields. As used herein, the term "server computer system" refers to the server component of the traditional client-server computing model, as is generally understood in the information technology (IT) and computer networking fields. In general, throughout this document, and unless otherwise noted, the client computer system and server computer system use different versions of the Internet Protocol (IP) protocol. More specifically, if the client computer system is using IPv6, the server computer system is using IPv4. Likewise, if the client computer system is using IPv4, the server computer system is using IPv6.

As used herein, the term "IP version X" refers to the version of IP running on the client computer system and on the network to which the client computer system is attached. As used herein, the term "IP version Y" refers to the version of IP running on the server computer system and on the network to which the server computer system is attached.

As used herein, the term "IP X-Y service" refers to a service of providing support that enables content transfer between a network communicating according to a first IP version and a network communicating according to a second IP version.

According to one aspect, a method is provided for provisioning a system and apparatus that enables IP version X client computer systems to communicate with IP version Y server computer systems, where X and Y are different versions of the IP protocol. The method receives input from a customer regarding existing IP version Y server computer systems and content, and subsequently performs operations according to various example embodiments to enable communication to said server by IP version X client computer systems.

According to another aspect, a method is provided for provisioning a system and apparatus that enables IP version X client computer systems to communicate with IP version Y server computer systems, where X and Y are differing versions of the IP protocol, without the need to make changes to any IP version Y server computer systems or IP version X client computer systems. The system is transparent to IP version Y server computer systems and IP version X client computer systems.

According to another aspect, a method is provided for provisioning a system and apparatus that enables IP version X client computer systems to communicate with IP version Y server computer systems, where X and Y are differing versions of the IP protocol, and for provisioning one or more optional services. The optional services enable additional functionality to be offered to customers as they seek to make their IP version Y server computer systems accessible by IP version X client computer systems. Various examples of optional services are presented below, by way of example, but not by way of limitation.

According to another aspect, a system for making IP version Y server computer systems and content available to IP version X client computer systems is provided, where X and Y are different versions of the IP protocol. The system includes one or more processors and memory communicatively coupled to the one or more processors. The memory includes one or more sequences of one or more instructions which, when executed by the one or more processors, cause the one or more processors to perform several steps. First, the system is configured and provisioned according to information provided by the customer and according to various example embodiments. Finally, IP version X client computer systems and IP version Y server computer systems are able to communicate and exchange data via the said apparatus.

According to another aspect, a system is provided for rewriting links embedded within the content provided by the IP version Y server computer system for the purpose of enabling IP version X client computer systems to communicate with other the IP version Y server computer systems to which the links correspond (where Y and X are differing versions of the IP protocol). The system includes one or more processors and memory communicatively coupled to the one or more processors. The memory includes one or more sequences of one or more instructions which, when executed by the one or more processors, cause the one or more processors to perform several steps.

Example embodiments may advantageously provide a service whereby a customer to an IP X-Y service (e.g. a content provider) can make their existing content that is currently accessible by an IPv4 network available to clients within an IPv6 network without any changes to the existing IPv4 computer systems or IPv6 clients. Furthermore, an example embodiment may provide a solution whereby a customer can make their existing content that is currently accessible on IPv6 networks available to clients on IPv4 networks without any changes to the existing IPv6 computer systems or IPv4 clients. In both scenarios, limited or no technical expertise is needed on the part of the customer.

FIG. 1 is a block diagram illustrating an IP X-to-Y system 100. The IP X-to-Y system 100 provides content from a first network (e.g., one that communicates according IPv4) to a second network (e.g., one that communicates according IPv6). In example embodiments, the IP X-to-Y system 100 may also provide content distribution in the reverse direction. That is, the IP X-to-Y system 100 may provide content from the second network (e.g., one that communicates via IPv6) to the first network (e.g., one that communicates according to IPv4).

The IP X-to-Y system 100 includes an IP version Y network 106 that includes an IP version Y server computer system 104, a proxy server 108, and an IP version X network 110 that includes an IP version X DNS system 102 and an IP version X client computer system 112. The IP version Y network 106 communicates according to one version of IP (e.g., IPv6), while IP version X network 110 communications according to a different version of IP (e.g., IPv4).

The IP version X client computer system 112 transmits requests for content over the IP version X network 110. For example, the IP version X client computer system 112 may run a web client (e.g., a browser, such as the INTERNET EXPLORER browser developed by Microsoft Corporation of Redmond). The web client, responsive to a user's request, may transmit a request over the IP version X network 110 for a piece of content. For example, the user may have entered a uniform resource locator (URL) and uniform resource identifier (URI) in the browser's address bar or clicked on a hyperlink contained in a displayed webpage. In either case, to locate where the IP version X client computer system 112 is to transmit the request, the IP version X DNS system 102 may resolve the host name (e.g., the URL) to an IP address. In the IP X-to-Y system 100, the host name may be resolved to an IP address associated with the proxy server 108. Communication from the IP version X client computer system 112 to the proxy server 108 is transmitted according to IP version X.

Responsive to receiving the request transmitted by the IP version X client computer system 112 over the IP version X network 110, the proxy server 108 may retrieve the content from IP version Y server computer system 104, via the IP version Y network 106. Communication from the proxy server 108 to the IP version Y server computer system 104 is transmitted according to IP version Y.

Ultimately, the proxy server 108 may transmit the content to the IP version X client computer system 112, according to IP version X. In this way, IP version X client computer system 112 is not required to support IP version Y. Nor is the IP version Y server computer system 104 required to support IP version X.

Figure 2:
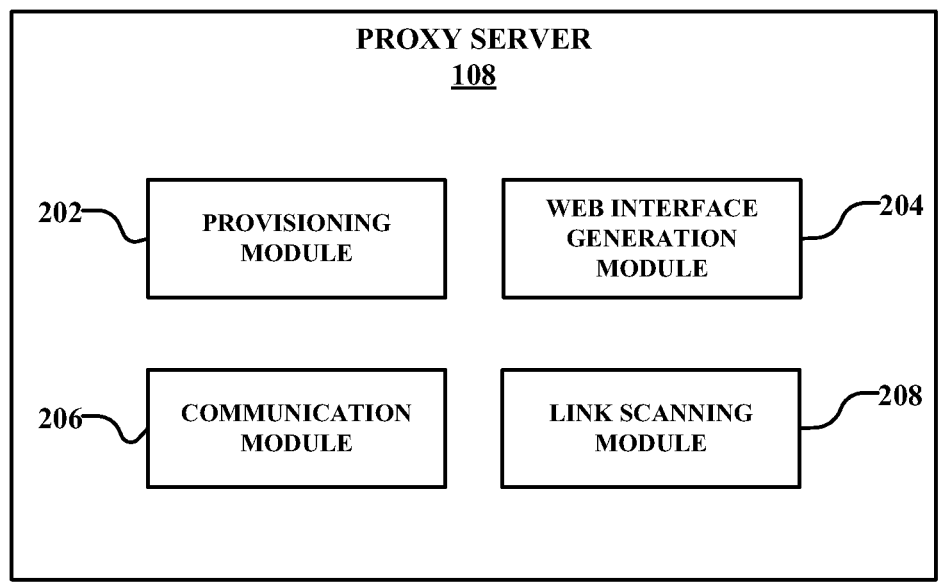
FIG. 2 is a schematic diagram illustrating a system for providing content from one or more networks that transmit content according to different versions of the IP protocol, according to some embodiments.

Referring now to FIG. 2, FIG. 2 is a block diagram illustrating the modules 200 of the proxy server 108 of FIG. 1. FIG. 2 shows that the proxy server 108 includes a web interface generation module 204, a provisioning module 202, a communication module 206, and a link scanning module 208.

The web interface generation module 204 generates one or more web interfaces that guide a customer, such as a content provider, through a series of data input prompts to set up a web service for provisioning content. In some embodiments, the web interfaces may be a series of web pages accessible over a network via a browser application.

The provisioning module 202 provisions the content of the IP version Y server computer system 104 as being supported by the proxy server 108. In some embodiments, provisioning may be accomplished using the data input by a customer in the web interfaces generated by the web interface generation module 204. Provisioning is further described below with reference to the example methods disclosed herein.

The communication module 206 transmits and receives communications from and to the IP version Y network 106 and the IP version X network 110. In some embodiments, the communication module 206 transmits the web interfaces generated by the web interface generation module 204 to a customer and receives data entered into the web interfaces by the customer. In some embodiments, the communication module 206 receives requests from a client device 112 connected to an IP version X network 110 for content. In some embodiments, the communication module 206 transmits the request from the client device 112 to a content server(s) 104 of the customer to retrieve the requested content. In some embodiments, the communication module 206 transmits the retrieved content to the client device 112.

The link scanning module 208 transforms links included in requested content to a form that results in content requests being mapped to the proxy server 108. For example, a requested content served by IP version Y server computer system 104 may include links that if not otherwise transformed, may map to a network that communicates via an IP version unsupported by the client computer system 112 (e.g., IP version Y), thereby making some portion of the served page inoperable. To prevent this, the link scanning module 208 may transform the embedded links so that the link is associated with the proxy server 108, as is explained further below.

In some embodiments, a provisioning service is provided to set up a customer with an IP X-Y service (e.g., a content provider). As described herein, the customer may provide a user (e.g., an administrator of the IP X-Y service) with provisioning information that allows the proxy server 108 to facilitate content across networks that communicate according to different IP versions.

Figure 3:
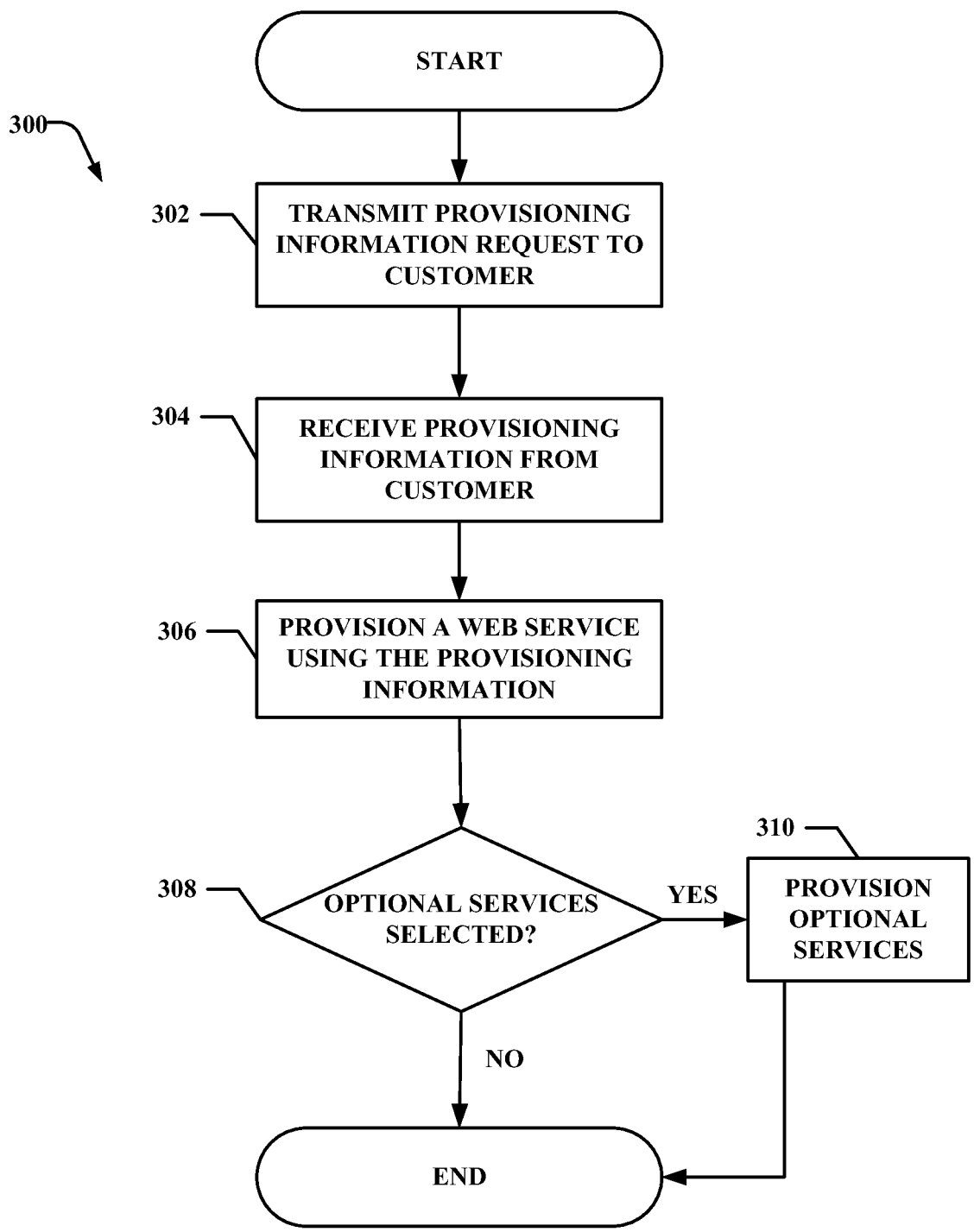
FIG. 3 is a flow diagram showing an example method of retrieving content from a computer system that transmits data according to different versions of the IP protocol, according to some embodiments.

FIG. 3 is a flow diagram showing an example method 300 of providing content originating on IP version Y server computer systems to IP version X client computer systems. To facilitate the explanation of the example method 300, diagram 700 (see FIG. 7) depicting an example approach for providing a service to a customer, according to some embodiments, is also described herein.

Figure 7:
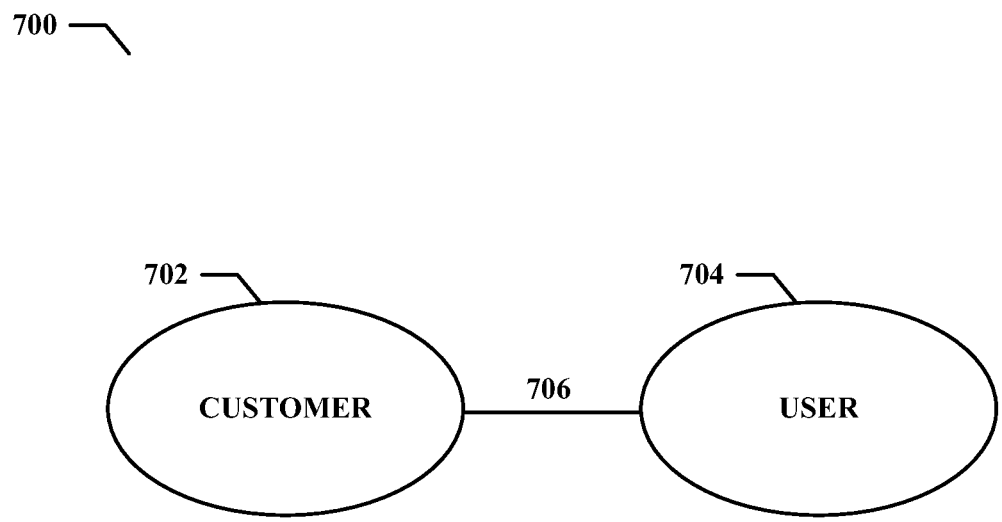
FIG. 7 is a diagram depicting an approach for providing a service to a customer, according to some embodiments.

As shown by FIG. 7, a customer 702 is connected to a user 704 via a communication link 706. In some embodiments, the customer 702 may be associated with a content provider. For example, the customer 702 may be web server operating a programmatic interface and, in other example embodiments, the customer 702 may be an employee or agent of an entity with legal control over the content provider.

The user 704 may be associated with a web service providing the IP X-to-Y services and, in some embodiments, IP Y-to-X services. In some embodiments, the web services may include converting content from an IP X version to an IP Y version or vice versa. The user 704 may be a web server operating a programmatic interface, and, in other example embodiments, the user 704 may be an employee or agent of an entity with legal control over the IP X-Y service.

The communication link 706 transmits provisioning information (further described below) from the customer 702 to the user 704. The provisioning information may be transmitted using any one of a number of well-known transfer protocols (e.g., Hypertext Transfer Protocol (HTTP)) over a communication network. Examples of communication networks include but are not limited to a local area network (LAN), a wide area network (WAN), the Internet, mobile telephone networks, Plain Old Telephone Service (POTS) networks, and wireless data networks (e.g., Wi-Fi and WiMax networks).

Referring back to FIG. 3, at block 302, the user 704 (which includes but is not limited to a human being, a computer system, or a machine) transmits a provisioning information request to the customer 702 (the customer 702 may be, but is not limited to, an administrator of an existing server computer system or a computer content owner). The provisioning information request may include, but is not limited to, one or more of a request for an indication of a version of IP that is running on the existing server computer system, a request for an indication of a version of IP that is running on the client computer systems, a request for a fully qualified domain name of the existing server computer system, a request for one or more desired fully qualified domain names that client computer systems may use to obtain access to the server computer system, and a request for an indication of content provided by the server computer system.

In some embodiments, the provisioning information request may further include other similar information to identify the existing server computer system and how the server computer system is to be accessed by client computer systems, the means by which the existing content is to be retrieved (options may include, but are not limited to, the Internet, a leased or private telecommunications line, a WAN connection, a LAN connection, or a wireless connection), the means by which the content is to be delivered to the client (options may include, but are not limited to, the Internet, a leased or private telecommunications line, a WAN connection, a LAN connection, or a wireless connection), encryption options, content modification options, load balancing options, authentication options, security options, proxy options, and/or any other options that pertain to retrieving and delivering content. The user 704 may inform the customer 702 which of the pieces of information are required and which are optional. Example embodiments may differ in which pieces of information are considered required and which pieces of information are considered optional. In some embodiments, the minimally required pieces of information are the fully qualified domain name of the existing server computer system, and the desired fully qualified domain name or names by which the client computer systems access the server computer system. A default or suggested option may be presented to the customer 702 for any of the options presented. Optional provisioning information provided by the customer may be provisioned as optional services by the web service provided by the user 704. Block 302 may be performed through any means of transmitting information 706, to include but not limited to a verbal signal, a written signal, an electronic signal, a visual signal, etc. Further, this operation is not limited to informing the customer 702 of only the options listed above, or any specific number of options.

At block 304, the user 704 receives from the customer 702 provisioning information that identifies the server computer system and the options selected by the customer 702. The user 704 may receive the provisioning information in any known manner, such as by asking the customer 702 for a preference and then listening for a vocal response, by providing an electronic computer interface (e.g., a web page) by which the customer can enter an electronic response, and so forth. Any means of inquiring a customer 702 and obtaining information requested to provision the service can be utilized, according to example embodiments. If the user 704 is a human, the customer 702 responses may be recorded in the user's 704 brain, on a piece of paper, in an electronic device, or in any other manner known in the field. If the user 704 is a machine or computer, the customer 702 responses may be recorded in any known information storage device, including, but not limited to, RAM, magnetic media, optical media, or any other electronic medium.

At block 306, the user 704 utilizes the minimally required information received from the customer 702 in block 304 to provision the web service offering. Provisioning may be performed automatically (e.g., via computer systems, electronic devices, or machines) or manually (e.g., via an administrator). In an example embodiment, a human or an automated computer system provisions the desired fully qualified domain name in the DNS system of the IP version X network 110, as well as the proxy server 108, as shown in FIG. 1. The fully qualified domain name will resolve to an IP version X address (where X is the version of IP being run by the client computer system 112) registered to the proxy server 108 component.

In some embodiments, provisioning the web service may entail configuring and registering an IP version X address that is associated with a hostname and/or an IP version Y address used by the customer 702. The IP version X address may be used to direct traffic to the proxy server 108 component rather than the customer 702. The proxy server 108 may then direct content hosted on an IP version Y network by the customer 702 to an IP version X network having clients connected thereto.

In some embodiments, provisioning the web service may entail providing an IP version X address to the customer 702. In some embodiments, the customer 702 may host their own DNS server that resolves the customer's 702 domain name. In these situations, the IP version X address is given to the customer 702 to permit the customer to resolve the IP version X address themselves. In some embodiments, the IP version X address may be given to a third party that hosts a DNS server. In some embodiments, the proxy server 108 may provide the IP version X address to the third party or, in other embodiments, the proxy server 108 may provide the IP version X address to the customer 702 for the purpose of the customer 702 registering the IP version X address with the third party.

At block 308, the user 704 determines whether or not the customer 702 selected any optional services as recorded in block 306. If yes, then the example method proceeds to block 310. If no, then the example method ends.

In block 310, the user 704 utilizes the information regarding optional services as provided by the customer 702 in block 306 to provision the optional services. Provisioning may include manual or automatic input of data into the computer systems.

To illustrate the example method of FIG. 3, consider a non-limiting example embodiment in which a customer 704 may be a content provider having a website with a fully qualified domain name "www.abcd.com" that is resolved to an IPv4 address. A client having an assigned IPv4 address may access content from the customer 704 by typing www.abcd.com in a browser application. A DNS server, associated with the customer 704 in some embodiments, may resolve the domain name into the IPv4 address associated with a content provider server. The client may then access content from the content provider server.

In the case of a client connected to an IPv6 network, the client may not be able to access the customer's 704 content maintained on an IPv4 network due to the incompatibilities of IPv4 and IPv6. In some embodiments, the customer 704 may register for a web service provisioned by the proxy server 108 of FIG. 1 to facilitate content delivery between an IPv4 device and an IPv6 device. The customer 704 may access a web service offered by a third party associated with the proxy server 108 and input information relating to the customer's 704 domain name and IP version into one or more web interfaces associated with the web service. For example, the customer 704 may input the fully qualified domain name "www.abcd.com" in the web interfaces along with other provisioning data discussed herein. In response, the proxy server 108 generates an IPv6 address that is either registered to the proxy server 108 or provided to the customer 704 for hosting. In the event the IPv6 address is registered to the proxy server 108, when an IPv6 client attempts to access the customer's domain name (e.g., "www.abcd.com"), the domain name is resolved by a DNS resolver into the generated IPv6 address and redirected to the proxy server 108. The proxy server 108, and not the content provider server, thus receives the request for content from the IPv6 client, retrieves content from the customer's 704 content provider server, and provides the content to the IPv6 client.

Figure 4:
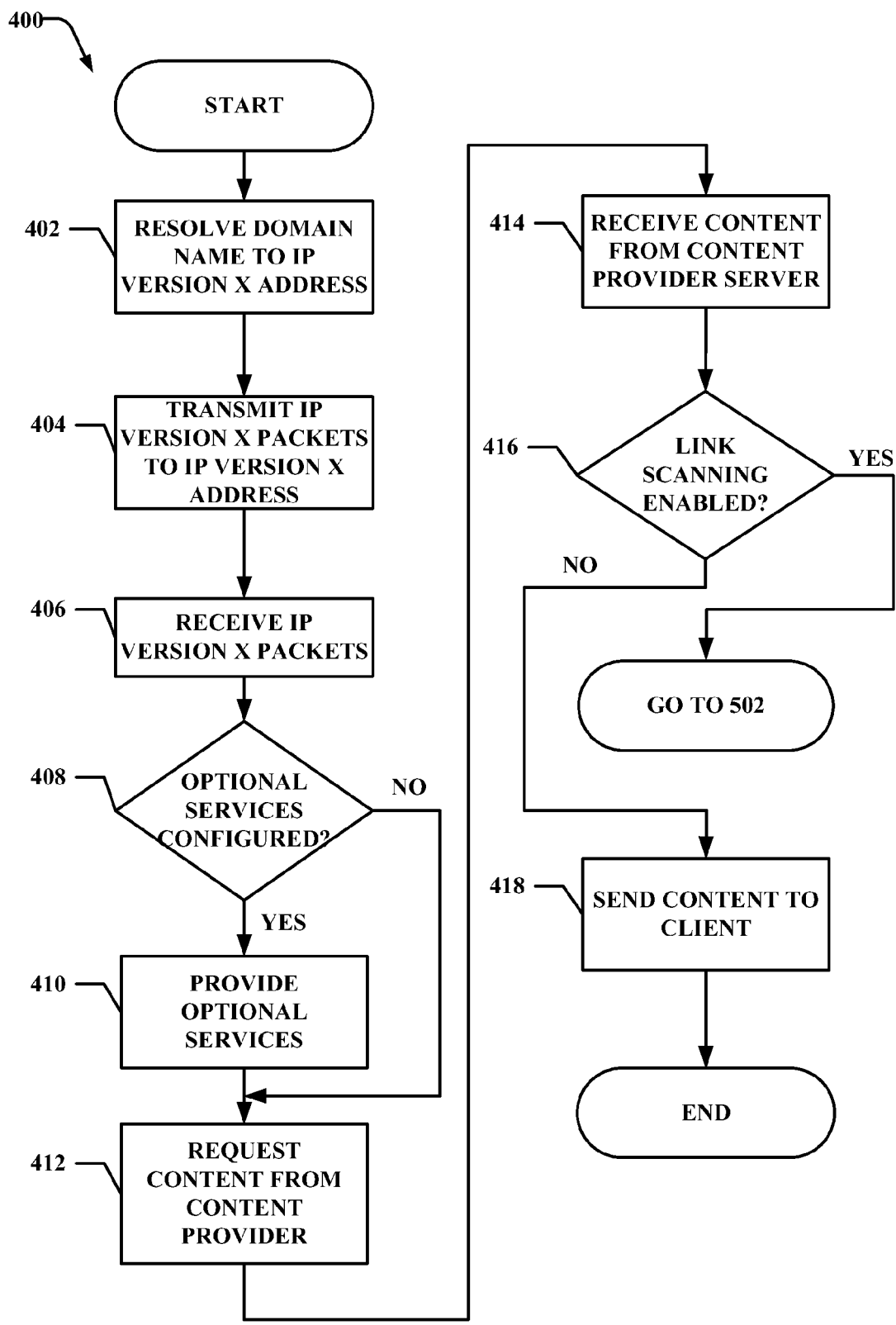
FIG. 4 is a flow diagram depicting an example method of accessing content through embedded information in links, according to some embodiments.

FIG. 4 is flow diagram illustrating an example method 400 of retrieving, by the client computer system 112 on one IP network, content from the server computer system 104 on another IP network of a different version, in accordance with various example embodiments.

Once the service has been provisioned, as described above with respect to FIG. 3, the client computer system 112 attempting to access the server computer system 206 may perform the following operations.

At block 402, the client computer system 112 attempts to resolve a known fully qualified domain name to an IP version X address, where X is the version of IP being run by the client. A purpose of block 402 is to discover the IP version X address associated with the fully qualified domain name. In some embodiments, the client computer system 112 already knows the IP version X address and does not have to resolve the fully qualified domain name. In example embodiments, block 402 may be performed by a domain name server (DNS) resolver computer program running on the client computer system 112, whereby the resolver queries the IP version X DNS system 102. However, any method of resolving fully qualified domain names to IP addresses may be performed, including, but not limited to, hosts files and other methods of manually or dynamically associating fully qualified domain names with IP version X addresses. The result of the attempted resolution should be the IP version X address provisioned in block 306 of FIG. 3.

Once the client computer system 112 obtains the IP version X address that corresponds to the fully qualified domain name being queried, the client begins sending IP version X packets to said IP version X address at block 404. The IP version X network 110 routes the packets to the computer system (e.g., the proxy server 108, see FIG. 1) to which said IP version X address is assigned according to block 306 of FIG. 3.

At block 406, the packets arrive at the proxy server 108, and the proxy server 108 receives the IP version X packets. In some embodiments, the proxy server 108 may optionally differentiate between various characteristics of the client computer system 112, such as, but not limited to, the client's browser type, operating system, or any other characteristics of the client computer system. The proxy server 108 may optionally use this information to determine how to respond to the client computer system 112, how to retrieve content from the origin server or for any other purpose determined appropriate by the user 704 of FIG. 7.

At block 408, the proxy server 108 determines whether optional service A has been provisioned. Optional service A is a placeholder for any of the optional services provisioned by the user 704 according to block 310 of FIG. 3. If optional services have been provisioned, the method 100 proceeds to block 410. If optional services have not been provisioned, the method proceeds to block 412.

At block 310, the proxy server 108 provides the optional services provisioned at block 310 of FIG. 3.

At block 412, in an example embodiment, the proxy server 108 initiates a new connection across the IP version Y network 106 to the server computer system 104 that hosts the content being requested by the client computer system 112. Any IP version Y transport method requested by the customer 702 of FIG. 7 and provided by the user 704 may be used to route the communication from the proxy server 108 to the server computer system 104 to include, but not limited to, the IP version Y Internet, a leased or private telecommunications line, a LAN connection, a WAN connection, or a wireless connection. This connection from the proxy server 108 to the server computer system 104 may follow the same process by which any typical IP version Y client would establish a connection to an IP version Y server. In another example embodiment, locally-originated or cached content may be sent back to the client computer system 112 by the proxy server 108 without the need to retrieve the content from the server computer system 104.

In another example embodiment, according to block 412, the proxy server 108 does not actually initiate a new connection across the IP version Y network 106 to the server computer system 104. In this embodiment, the proxy server 108 may use a pre-established connection, or may merely translate certain parts of the packets already generated by the client computer system 112. Other example embodiments, the proxy server 108 may utilize other methods of facilitating the delivery of content to the client computer system 112.

At block 414, in response to the request from the proxy server 108 arriving at the server computer system 104, according to various example embodiments, the server computer system 104 serves the content requested, or otherwise responds to the proxy server 108 in whatever method or with whatever content is deemed appropriate by the owner of the server computer system 104. The server computer system 104 may respond with the content requested by the proxy server 108 on behalf of the client computer system 112. Packets are generated by the server computer system 104 and routed across the IP version Y network 106 to the proxy gateway 108.

At block 416, the proxy server 108 determines if link scanning is enabled. If link scanning is enabled, the method proceeds to block 502 of FIG. 5. If link scanning is disabled, the method proceeds to block 418.

At block 418, the proxy server 108 performs conversions, modifications, translations, or other changes to the content to make the content usable by the client computer system 112. The proxy server 108 may perform one or more conversions, modifications, translations, or other changes. By way of example, but not by way of limitation, conversions, modifications, translations, or changes may be performed at any layer of the Open System Interconnect (OSI) model, Transmission Control Protocol/Internet Protocol (TCP/IP) model, or any other network model.

Figure 5:
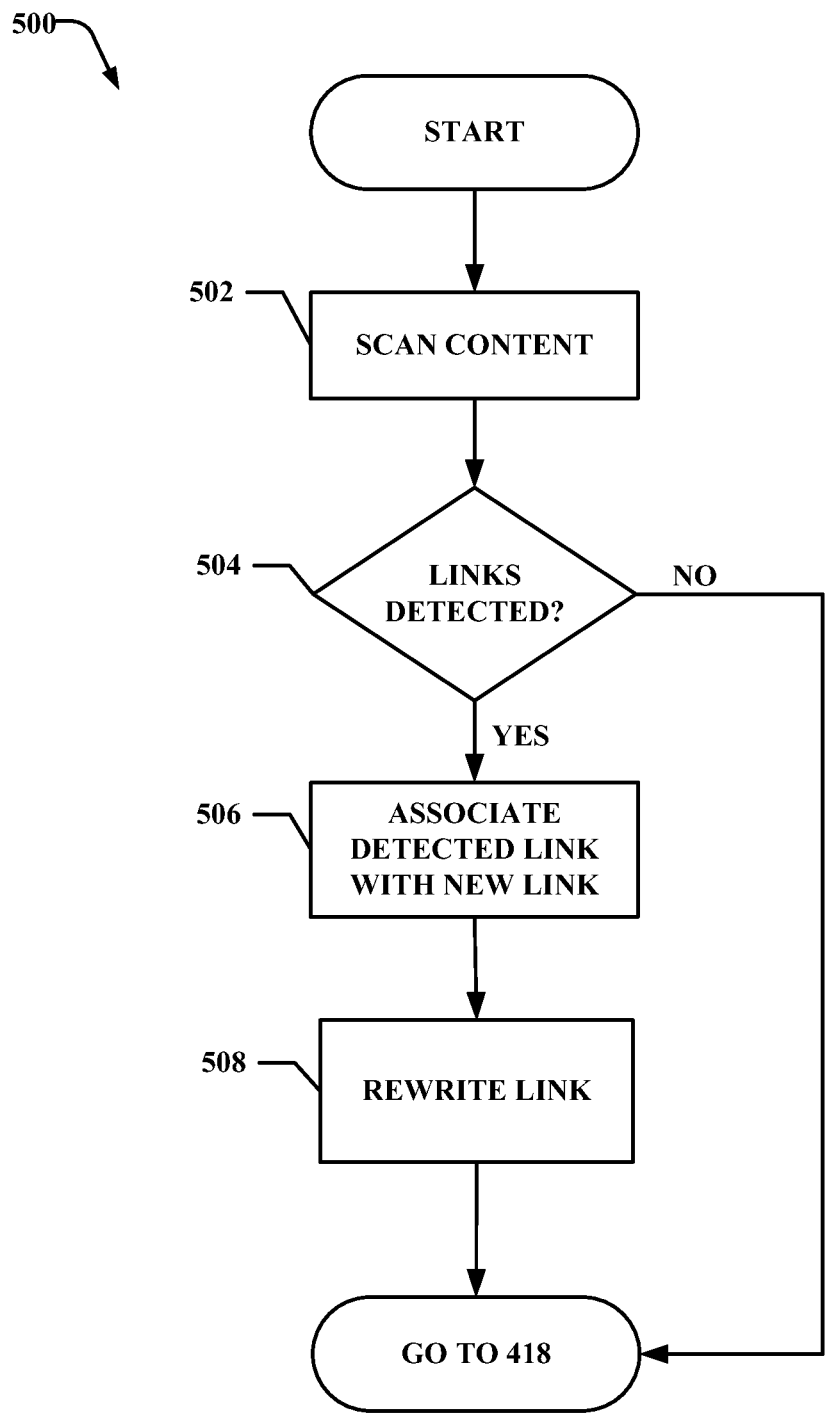
FIG. 5 is a block diagram that illustrates a computer system upon which example embodiments may be implemented, according to some embodiments.

FIG. 5 is a flow diagram showing an example method 500 of rewriting the links embedded within the content being delivered to the client computer system 112 so that that client 112 can still access the server computer system 104, as referenced in the link and in accordance with an example embodiment.

Links embedded within the content may be troublesome because the link may direct the client computer system 112 to another server computer system (not shown) that resides on an IP version Y network 106 and that is different from the server computer system 104 on which the link originated. When the client computer system 112 attempts to communicate with the server computer system referenced in said link, communications will fail. In order to fix the problem, the following example method 500 may be applied in some embodiments.

At block 502, the proxy server 108 scans the content from the server computer system 104 to determine whether or not links are embedded within the content. At block 504, if links are found to be embedded within the content, the method 500 proceeds to block 506. If links are not found to be embedded within the content, the method 500 proceeds to block 418 of FIG. 4.

At block 506, the proxy server 108 associates the original link with a new link. Not every original link may be associated with a new link; original links can be included or excluded from the association process according to any administrative policy put in place by the user 704 of FIG. 7. The new link contains information that the client computer system 112 can use to communicate with the proxy server 108, such as, but not limited to, an IP version X address registered with the proxy server 108 or any fully qualified domain name associated with an IP version X address registered to the proxy server 108 within the IP version X DNS system 102. For example, the new link may be written as http://IP version X domain name/old link, where the "old link" portion may be a domain name resolved to an IP version Y address and the "IP version X domain name" may be a domain name resolved to an IP version X address registered to the proxy server 108.

Any method of uniquely identifying the proxy server 108 to the client computer system 112 may be utilized. The uniform resource identifier (URI) portion of the new link contains information that the proxy server 108 can use to uniquely identify the original link. In some embodiments, the URI portion of the new link contains a unique sequence number or identifier that temporarily identifies the original link. The sequence number can take any form, but is preferably long enough and complex enough to allow for hundreds of millions of permutations. In some embodiments, the new link is associated with the original link and stored in the memory of the proxy server 108. The new link may be stored in memory for any length of time. In some embodiments, the new link is stored in memory for a few minutes.

When the client computer system 112 attempts to access the new link, the traffic generated by the client computer system 112 containing the new link is routed across the IP version X network 110 to the proxy server 108, and the proxy server 108 uses the new link to find the original link according to the association stored in memory to retrieve the content on behalf of the client computer system 112. In another embodiment, rather than embedding a unique sequence number in the URI portion of the new link, the proxy server 108 embeds the original link in the URI portion of the new link. When the client computer system 112 attempts to access the new link, the traffic generated by the client computer system 112 containing the new link is routed across the IP version X network 110 to the proxy server 108, and the proxy server 108 extracts the embedded link and uses the extracted link to retrieve the content on behalf of the client computer system 112. In some embodiments, rather than embedding the actual original link in the URI portion of the new link, a representation of the original link is embedded in the URI portion of the new link. When the client computer system 112 attempts to access the new link, the traffic generated by the client computer system 112 containing the new link is routed across the IP version X network 110 to the proxy server 108. The proxy server 108 extracts the embedded representation and uses it to extrapolate the original link, and then uses the extrapolated original link either by way of memory or by way of recognition to retrieve the content on behalf of the client computer system 112.

At block 508, the proxy server 108 rewrites the links contained within the content according to the block 506 prior to sending to the content to the client computer system 112 at block 418. Not every original link may be rewritten with a new link; original links can be included or excluded from the rewrite process according to any administrative policy put in place by the user 704.

Implementation Mechanisms

Example embodiments described herein may be implemented in hardware circuitry, in computer software, or a combination of hardware circuitry and computer software and is not limited to a particular hardware or software implementation.

Figure 6:
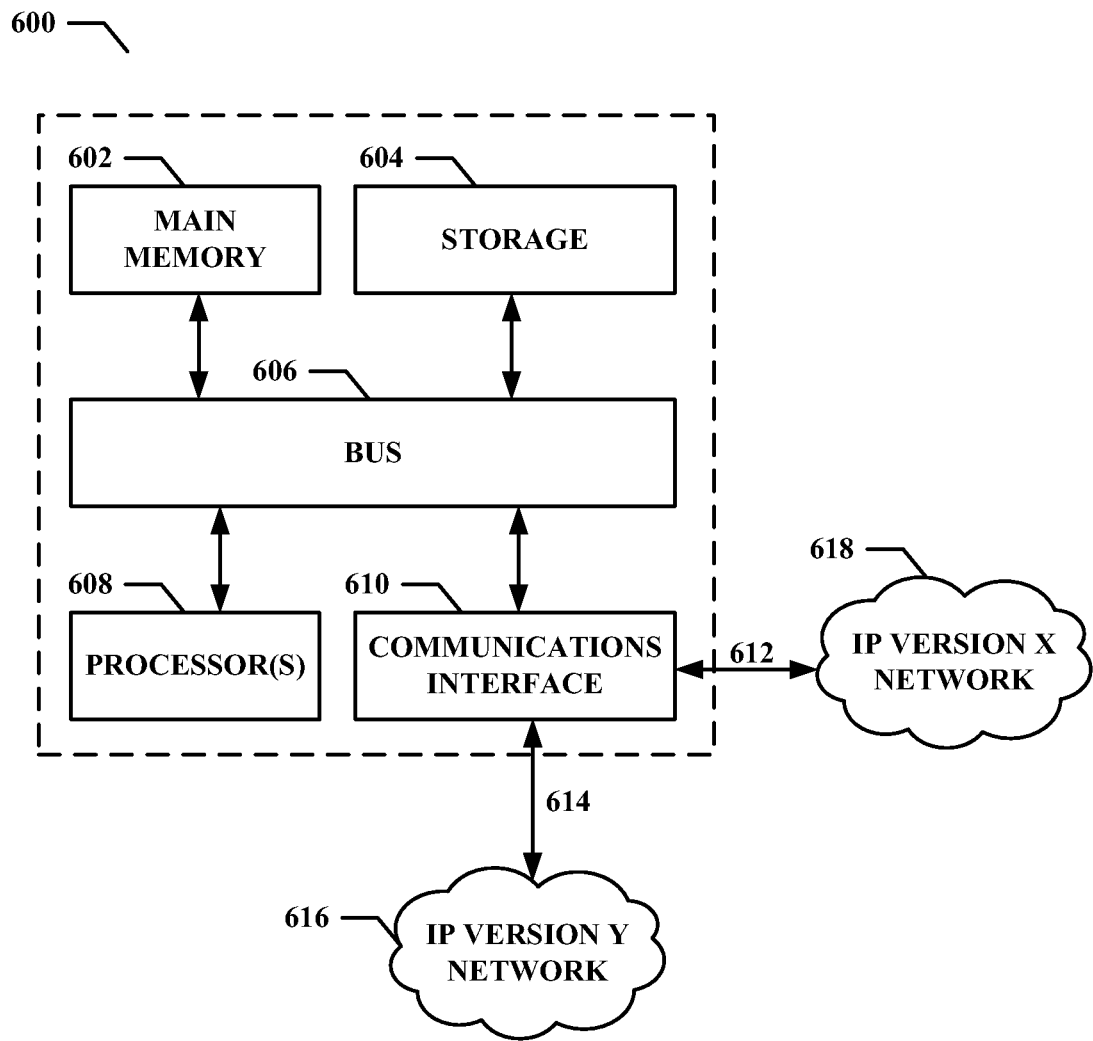
FIG. 6 is a block diagram illustrating components of a proxy gateway, according to some embodiments.

FIG. 6 is a block diagram that illustrates a computer system 600 upon which example embodiments may be implemented. Computer system 600 includes a bus 606 or other communication mechanism for communicating information, and at least one processor 608 coupled with bus 606 for processing information. Computer system 600 also includes a main memory 602, such as a random access memory (RAM) or other dynamic storage device, coupled to bus 606 for storing information and instructions to be executed by processor 608. Main memory 602 also may be used for storing temporary variables or other intermediate information during execution of instructions to be executed by processor 608. A storage device 604, such as, but not limited to, a magnetic disk or optical disk, is provided and coupled to bus 606 for storing information and instructions.

Computer system 600 also includes a communication interface 610 coupled to bus 606. Communication interface 610 provides a two-way data communication coupling to an IP version X network link 612 that is connected to an IP version X network 618. Communication interface 610 also provides a two-way data communication coupling to an IP version Y network link 614 that is connected to an IP version Y network 616. IP version X network links 612 and IP version Y network link 614 may include one or more links, according to some embodiments. Additionally, the communication interface 610 may include one or more interfaces, according to an example embodiment. Any types of links (for example, but not limited to, LAN, WAN, optical, electrical, or wireless) are covered according to example embodiments. In any such implementation, communication interface 610 sends and receives electrical, electromagnetic, or optical signals that carry digital data streams representing various types of information.

An example embodiment is related to the use of computer system 600 for providing IPv6 services to customers. According to one example embodiment, the providing of IPv6 services to customers is provided by computer system 600 in response to processor 608 executing one or more sequences of one or more instructions contained in main memory 602. Such instructions may be read into main memory 602 from another computer-readable medium, such as a storage device 604. Execution of the sequences of instructions contained in main memory 602 causes processor 608 to perform the methods described herein. One or more processors in a multi-processing arrangement may also be employed to execute the sequences of instructions contained in main memory 602. In alternate embodiments, hard-wired circuitry may be used in place of or in combination with software instructions to implement various example embodiments. Thus, embodiments are not limited to any specific combination of hardware circuitry and software.

Exemplary Machine

Figure 8:
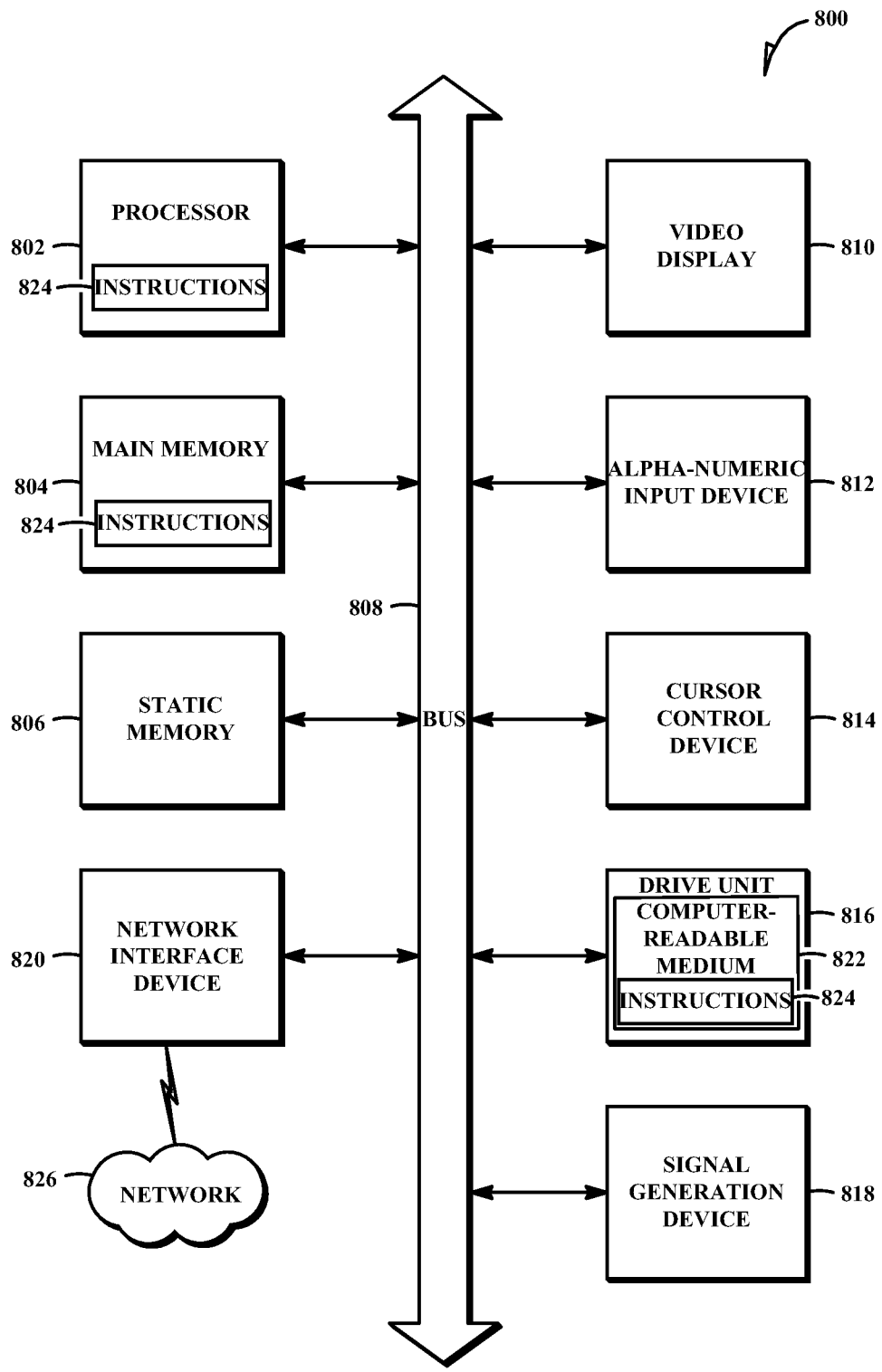
FIG. 8 shows a diagrammatic representation of machine in the example form of a computer system within which a set of instructions may be executed to cause the machine to perform any one or more of the methodologies discussed herein.

FIG. 8 depicts a block diagram of a machine in the example form of a computer system 800 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment or as a peer machine in a peer-to-peer (or distributed) network environment. The computer system 800 may include, but is not limited to, a desktop computer system, a laptop computer system, a server, a mobile phone, a smart phone, a personal digital assistant (PDA), a gaming console, a portable gaming console, a set top box, a camera, a printer, a television set, or any other electronic device.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computer system 800 includes a processor 802 (e.g., a central processing unit (CPU), a graphics processing unit (GPU) or both), and memory 804, which communicate with each other via bus 808. Memory 804 includes volatile memory devices (e.g., DRAM, SRAM, DDR RAM, or other volatile solid state memory devices), non-volatile memory devices (e.g., magnetic disk memory devices, optical disk memory devices, flash memory devices, tape drives, or other non-volatile solid state memory devices), or a combination thereof. Memory 804 may optionally include one or more storage devices remotely located from the computer system 800. The computer system 800 may further include a video display unit 806 (e.g., a plasma display, a liquid crystal display (LCD) or a cathode ray tube (CRT)). The computer system 800 also includes input devices 810 (e.g., keyboard, mouse, trackball, touchscreen display, etc.), output devices 812 (e.g., speakers), and a network interface device 816. For example, the video display unit 806, the input devices 810, and the output devices 812 may exist outside of the housing, but be coupled to the bus 808 via external ports or connectors accessible on the outside of the housing.

Memory 804 includes a machine-readable medium 820 on which is stored one or more sets of data structures and instructions 822 (e.g., software) embodying or utilized by any one or more of the methodologies or functions described herein. The one or more sets of data structures may store data. Note that a machine-readable medium refers to a storage medium that is readable by a machine (e.g., a computer-readable storage medium). The data structures and instructions 822 may also reside, completely or at least partially, within memory 804 and/or within the processor 802 during execution thereof by computer system 800, with memory 804 and processor 802 also constituting machine-readable, tangible media.

The data structures and instructions 822 may further be transmitted or received over a network 820 via network interface device 816 utilizing any one of a number of well-known transfer protocols (e.g., Hypertext Transfer Protocol (HTTP)).

Certain embodiments are described herein as including logic or a number of components, modules, or mechanisms. Modules may constitute either software modules (e.g., code and/or instructions embodied on a machine-readable medium or in a transmission signal) or hardware modules. A hardware module is a tangible unit capable of performing certain operations and may be configured or arranged in a certain manner. In example embodiments, one or more computer systems (e.g., the computer system 800) or one or more hardware modules of a computer system (e.g., a processor 802 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a processor 802 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a processor 802 configured using software, the processor 802 may be configured as respective different hardware modules at different times. Software may accordingly configure a processor 802, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 802 that are temporarily configured (e.g., by software, code, and/or instructions stored in a machine-readable medium) or permanently configured to perform the relevant operations. Whether temporarily or permanently configured, such processors 802 may constitute processor-implemented (or computer-implemented) modules that operate to perform one or more operations or functions. The modules referred to herein may, in some example embodiments, comprise processor-implemented (or computer-implemented) modules.

Moreover, the methods described herein may be at least partially processor-implemented (or computer-implemented) and/or processor-executable (or computer-executable). For example, at least some of the operations of a method may be performed by one or more processors 1202 or processor-implemented (or computer-implemented) modules. Similarly, at least some of the operations of a method may be governed by instructions that are stored in a computer readable storage medium and executed by one or more processors 802 or processor-implemented (or computer-implemented) modules. The performance of certain of the operations may be distributed among the one or more processors 802, not only residing within a single machine, but deployed across a number of machines. In some example embodiments, the processors 802 may be located in a single location (e.g., within a home environment, an office environment or as a server farm), while in other embodiments the processors 802 may be distributed across a number of locations.

While the embodiment(s) is (are) described with reference to various implementations and exploitations, it will be understood that these embodiments are illustrative and that the scope of the embodiment(s) is not limited to them. In general, techniques for the embodiments described herein may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and its practical applications, to thereby enable others skilled in the art to best utilize the embodiments and various embodiments with various modifications as are suited to the particular use contemplated.

What is claimed is:

1. A method comprising:
   receiving provisioning information from a content provider, the provisioning information including a fully qualified domain name and an Internet Protocol (IP) address of a first IP version associated with the fully qualified domain name;
   intercepting a request by a client device running a second IP version to access a content page from a content provider device registered to the IP address;
   retrieving the content page from the content provider device;
   scanning the content page to identify references to content items external from the content page, the references being embedded in the content page;
   for each of the references, determining whether the reference is to be rewritten based on whether an incompatibility between the first IP version and the second IP version makes a corresponding one of the content items inaccessible to the client device running the second IP version;
   for each embedded reference that is to be rewritten, rewriting, using a processor of a proxy server, the embedded reference as a new reference to the corresponding one of the content items, the new reference directing the client device to request the corresponding one of the content items from the proxy server instead of the content provider, the proxy server to retrieve the corresponding one of the content items on behalf of the client device in response to the client device using the new reference to request the corresponding one of the content items, the new reference being a representation of the embedded reference from which the embedded reference may be determined; and providing the content page, including the embedded references rewritten as the new references, to the client device.

2. The method of claim 1, further comprising:

generating an IP address of the second IP version; and registering the generated IP address with a domain name server, the domain name server mapping the fully qualified domain name to the generated IP address, wherein the generated IP address is registered to the proxy server.

3. The method of claim 1, wherein the new reference includes an identifier, the identifier being extractable by the proxy server for use in retrieving the corresponding one of the content items.

4. The method of claim 3, wherein the identifier is a unique sequence number corresponding to the embedded reference.

5. The method of claim 1, wherein the first IP version is one of IP version 4 and IP version 6 and the second IP version is the other one of the IP version 4 and IP version 6.

6. A system comprising:

one or more processors;

a proxy server implemented by the one or more processors and configured to, at least:

receive provisioning information from a content provider, the provisioning information including a fully qualified domain name and an Internet Protocol (IP) address of a first IP version associated with the fully qualified domain name;

intercept a request by a client device running a second IP version to access a content page from a content provider device registered to the IP address;

retrieve the content page from the content provider device;

scan the content page to identify references to content items external from the content page, the references being embedded in the content page;

for each of the references, determine whether the reference is to be rewritten based on whether an incompatibility between the first IP version and the second IP version makes a corresponding one of the content items inaccessible to the client device running the second IP version;

for each embedded reference that is to be rewritten, rewrite the embedded reference as a new reference to the corresponding one of the content items, the new reference directing the client device to request the corresponding one of the content items from a proxy server instead of the content provider, the proxy server to retrieve the corresponding one of the content items on behalf of the client device in response to the client device using the new reference to request the corresponding one of the content items; and provide the content page, including the embedded references rewritten as the new references, to the client device.

7. The system of claim 6, wherein the proxy server is further configured to:

generate an IP address of the second IP version; and register the generated IP address with a domain name server, the domain name server mapping the fully qualified domain name to the generated IP address, wherein the generated IP address is registered to the proxy server.

8. The system of claim 6, wherein the new reference includes an identifier, the identifier being extractable by the proxy server for use in retrieving the corresponding one of the content items.

9. The system of claim 8, wherein the identifier is a unique sequence number corresponding to the embedded reference.

10. The system of claim 6, wherein the first IP version is one of IP version 4 and IP version 6 and the second IP version is the other one of the IP version 4 and IP version 6.

11. The system of claim 6, further comprising a processor-implemented web interface generation module configured to generate at least one web interface to receive the provisioning information inputted by the content provider.

12. A non-transitory machine-readable storage medium storing a set of instructions that, when executed by at least one processor, cause the at least one processor to perform operations, the operations comprising:

receiving provisioning information from a content provider, the provisioning information including a fully qualified domain name and an Internet Protocol (IP) address of a first IP version associated with the fully qualified domain name;

intercepting a request by a client device running a second IP version to access a content page from a content provider device registered to the IP address;

retrieve the content page from the content provider device;

scanning the content page to identify references to content items external from the content page, the references being embedded in the content page;

for each of the references, determining whether the reference is to be rewritten based on whether an incompatibility between the first IP version and the second IP version makes a corresponding one of the content items inaccessible to the client device running the second IP version;

for each embedded reference that is to be rewritten, rewriting, using a processor of a proxy server, the embedded reference as a new reference to the corresponding one of the content items, the new reference directing the client device to request the corresponding one of the content items from the proxy server instead of the content provider, the proxy server to retrieve the corresponding one of the content items on behalf of the client device in response to the client device using the new reference to request the corresponding one of the content items, the new reference being a representation of the embedded reference from which the embedded reference may be determined; and providing the content page, including the embedded references rewritten as the new references, to the client device.

13. A method comprising:

intercepting a request for a content page from a client device;

retrieving the content page from a content provider;

scanning the content page to identify references to content items external from the content page, the references being embedded in the content page;

for each embedded reference that is inaccessible to the client device based on an incompatibility between a first IP version and a second IP version making a corresponding one of the content items inaccessible to the client device, rewriting the embedded reference as a new reference to the corresponding one of the content items, the new reference directing the client device to request the corresponding one of the content items from a proxy server instead of the content provider, the proxy server to retrieve the corresponding one of the content items on behalf of the client device in response to the client device using the new reference to request the corresponding one of the content items, the new reference being a representation of the embedded reference from which the embedded reference may be determined; and providing the retrieved content page, including the embedded references rewritten as the new references, to the client device.

14. The method of claim 13, wherein the representation of the embedded reference includes a unique identifier that is associated with the reference to the corresponding one of the content items.

15. The method of claim 14, wherein the unique identifier is a sequence number selected from a set of complex sequence numbers.

16. The method of claim 15, wherein the determination of the embedded reference includes recognizing the association between the unique identifier and the reference.

17. The method of claim 13, wherein the unique identifier is stored for a predetermined time period in a memory of the proxy server.

18. An apparatus comprising:
a processor-implemented proxy server configured to, at least:
intercept a request for a content page from a client device;
retrieve the content page from a content provider;
scan the content page to identify references to content items external from the content page, the references being embedded in the content page;
for each embedded reference that is inaccessible to the client device based on an incompatibility between a first IP version and a second IP version making a corresponding one of the content items inaccessible to the client device, rewrite the embedded reference as a new reference to the corresponding one of the content items, the new reference directing the client device to request the corresponding one of the content items from the proxy server instead of the content provider, the proxy server to retrieve the corresponding one of the content items on behalf of the client device in response to the client device using the new reference to request the corresponding one of the content items, the new reference being a representation of the embedded reference from which the embedded reference may be determined; and
provide the content page, including the embedded references rewritten as the new references, to the client device.

19. A non-transitory machine-readable storage medium storing a set of instructions that, when executed by at least one processor, cause the at least one processor to perform operations, the operations comprising:
intercepting a request for a content page from a client device;
retrieving the content page from a content provider;
scanning the content page to identify references to content items external from the content page, the references being embedded in the content page;
for each embedded reference that is inaccessible to the client device based on an incompatibility between a first IP version and a second IP version, making a corresponding one of the content items inaccessible to the client device, rewriting the embedded reference as a new reference to the corresponding one of the content items, the new reference directing the client device to request the corresponding one of the content items from a proxy server instead of the content provider, the proxy server to retrieve corresponding one of the content items on behalf of the client device in response to the client device using the new reference to request the corresponding one of the content items, the new reference being a representation of the embedded reference from which the embedded reference may be determined; and
providing the content page, including the embedded references rewritten as the new references, to the client device.

* * * * *